US010257315B2

(12) United States Patent
Sidhu et al.

(10) Patent No.: US 10,257,315 B2
(45) Date of Patent: Apr. 9, 2019

(54) SECURE PROXIED DATA RETRIEVAL FROM THIRD-PARTY SERVICES

(75) Inventors: Kiranjit Singh Sidhu, East Palo Alto, CA (US); Thomas Alison, Palo Alto, CA (US); Kenneth Foo Chuan Khit, Kuala Lumpur (MY); Kelvin Foo Chuan Lyi, Kuala Lumpur (MY)

(73) Assignee: Facebook, Inc., Menlo Park, CA (US)

( * ) Notice: Subject to any disclaimer, the term of this patent is extended or adjusted under 35 U.S.C. 154(b) by 86 days.

(21) Appl. No.: 13/355,989

(22) Filed: Jan. 23, 2012

(65) Prior Publication Data

US 2013/0191494 A1 Jul. 25, 2013

(51) Int. Cl.
*G06F 15/16* (2006.01)
*H04L 29/08* (2006.01)
*G06Q 50/00* (2012.01)
*H04L 29/06* (2006.01)

(52) U.S. Cl.
CPC ............. *H04L 67/34* (2013.01); *G06Q 50/01* (2013.01); *H04L 63/0281* (2013.01); *H04L 63/062* (2013.01); *H04L 63/102* (2013.01)

(58) Field of Classification Search
CPC ... H04L 67/34; H04L 63/0281; H04L 63/062; H04L 63/102; G06Q 50/01
USPC .................................................. 709/217–219
See application file for complete search history.

(56) References Cited

U.S. PATENT DOCUMENTS 8,341,270 B2 * 12/2012 Mazzaferri et al. .......... 709/227
8,448,072 B1 * 5/2013 Lai et al. ...................... 715/753
2002/0138551 A1 * 9/2002 Erickson ................. H04L 29/06
709/203
2002/0138621 A1 * 9/2002 Rutherford et al. .......... 709/227
2007/0094373 A1 * 4/2007 Brendel ......................... 709/223
2009/0132808 A1 * 5/2009 Baentsch ............. H04L 63/0471
713/152
2009/0222348 A1 * 9/2009 Ransom et al. ................ 705/14
2009/0222493 A1 * 9/2009 Smarr ............... G06F 17/30345
2010/0229241 A1 * 9/2010 Liu ..................... G06F 21/6254
726/26
2012/0197981 A1 * 8/2012 Chan .................. G06Q 30/0276
709/203
2012/0215560 A1 * 8/2012 Ofek ..................... G06F 19/322
705/3
2012/0294495 A1 * 11/2012 Wren .................. G06F 21/6263
382/118
2012/0330854 A1 * 12/2012 MacLaughlin ........ G06Q 10/10
705/319
2013/0036034 A1 * 2/2013 Karon et al. .................... 705/31
2013/0304731 A1 * 11/2013 Zheng ................ G06Q 30/0201
707/728
2014/0040991 A1 * 2/2014 Potonniee et al. ................ 726/4
2014/0052617 A1 * 2/2014 Chawla et al. ................. 705/39

\* cited by examiner

*Primary Examiner* — Oscar A Louie
*Assistant Examiner* — Oluwatosin M Gidado
(74) *Attorney, Agent, or Firm* — Baker Botts L.L.P.

(57) ABSTRACT

In one embodiment, a social networking system transmits a client proxy application to a client device in order to export data from a third-party site that has instituted IP address blocking or rate limiting. In particular embodiments, the proxy application multiplexes a plurality of web responses from the third-party server over a single socket communication with a proxy server. In particular embodiments, the proxy application obtains data from the third-party service and relays it via the proxy server to the social networking system.

18 Claims, 8 Drawing Sheets

300

Friends [Manage Friend List]

You have 165 Gmail contacts on Facebook that you can add as your friends.

You are already Facebook friends with 106 people from your Gmail contact list.

Select which contacts to add as friends from the list below. You can also Try another email account to find more friends.

Step 1 Find Friends | Step 2 Add Friends | Step 3 Invite Friends

☐ Select All Friends

☐ 柴村奈 chuang@hotmail.com ←301

☐ Alan Xin xin.alan@gmail.com ←302    Chicago

☐ Alex Chan xtude-gen.5@gmail.com ←303    CSU East Bay

☐ Alex Pan awp45@cornell.edu ←304    Cornell
NYU
Tencent

☐ Allen Kim

305 — [Add Friends] [Skip]

SECURE PROXIED DATA RETRIEVAL FROM THIRD-PARTY SERVICES

TECHNICAL FIELD

The present disclosure relates generally to the field of social networking.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

BRIEF DESCRIPTION OF THE DRAWINGS

FIG. 3 is an example user interface for a contact importer application after importing contacts.

DESCRIPTION OF EXAMPLE EMBODIMENTS

Figure 1A:
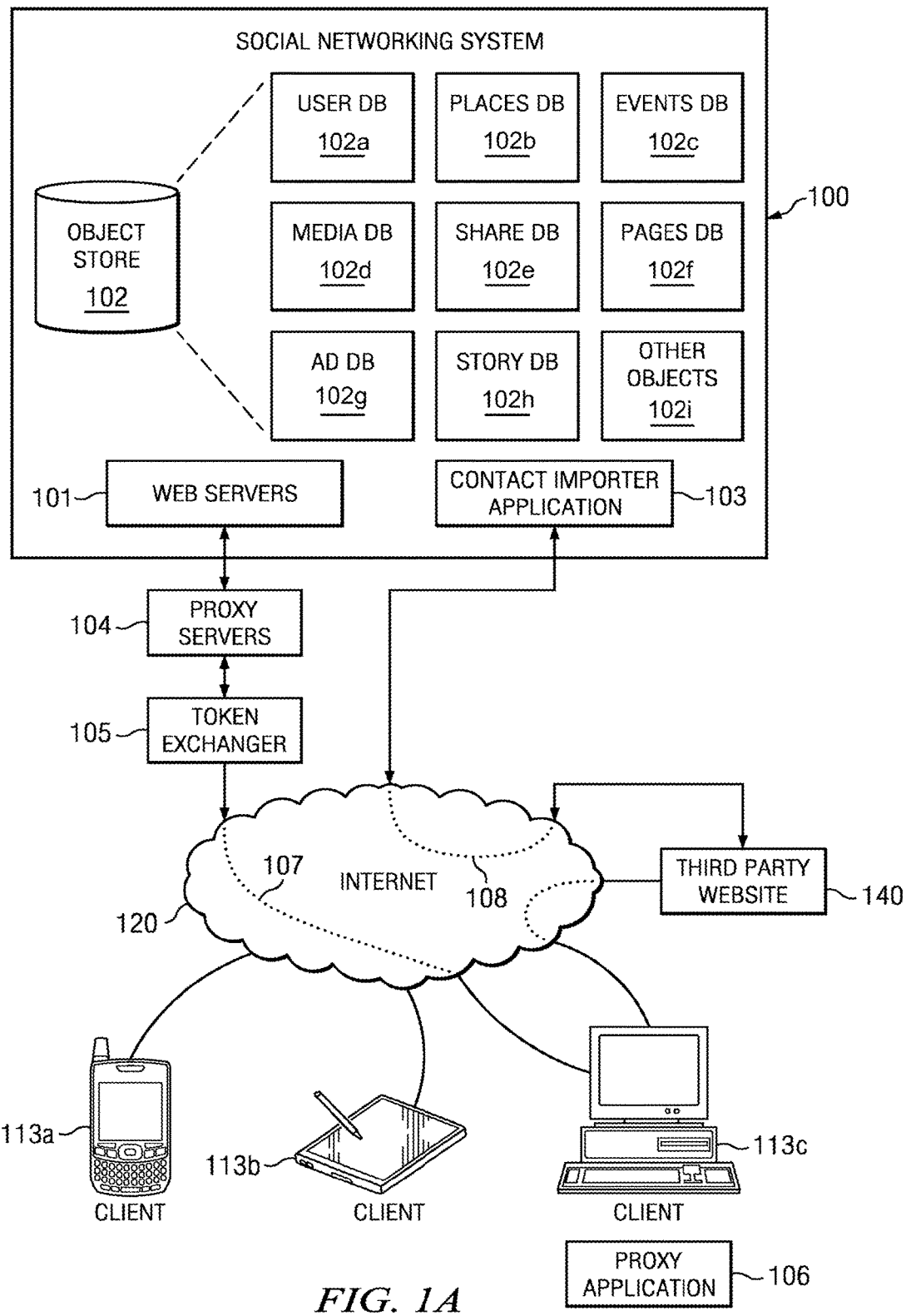
FIG. 1A illustrates an example computer network environment of an example social network environment.

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment. In particular embodiments, the social graph information further includes a plurality of edges that each define or represent a connection between a corresponding pair of nodes in the social graph.

In particular embodiments, the social networking system may interact with third-party websites or external servers. In particular embodiments, users of the social networking system may seek to find other users on the social networking system via an imported contacts list. For example, a user may desire to determine whether any of his or her e-mail contacts has a corresponding user account on the social networking system. As another example, a user may desire to find any of his or her connections from another social networking system, such as Twitter, Google+, MySpace, LinkedIn, etc. As yet another example, a user may desire to find any of his or her contacts from an instant messenger service, such as Yahoo! messenger, MSN messenger, ICQ, AIM, QQ, or the like. Because individually searching by username or email address for specific contacts is a tedious affair, the social networking system may provide a utility that allows a user to enter his or her login credentials for a particular third-party service that allows the social networking system's servers to directly connect to the third-party service's servers and download the user's contact list or address book.

However, third-party services may take measures to prevent exporting of its users' contact information to stifle competition or prevent a mass exodus of its users to another social networking system or service. Third-party servers may block contact importer access in a number of ways. For example, the third-party service may ban access from the social networking system's server IP addresses outright. As another example, the third-party service may rate-limit requests for contact exporting originating from a certain IP address or range of IP addresses; thus third-party servers will deny export requests received from the social networking system's servers.

Particular embodiments circumvent third-party blocking or rate-limiting through the use of one or more proxies. In particular embodiments, the social networking system installs a proxy application on the client device of a user requesting to import contacts. The proxy application requests contact information from the third-party service's servers, and relays the information to the social networking system for importing. In such embodiments, the servers of the third-party service are unable to distinguish the request via the proxy application as a genuine request to export contacts from the user.

In particular embodiments, an intermediate proxy server may be utilized to facilitate communication between the servers of the social networking system and the proxy application executed on the client machine. In particular embodiments, the connection between the proxy server and the proxy application may be multiplexed to support multiple contact export requests from a single proxy application. In this manner, not every single user requesting to import contacts from a third-party service may be required to install or execute the client proxy application. In particular embodiments, the proxy server and proxy application may exchange handshake messages with a certifying authority such as an external token exchanger in order to maintain security along the proxy-server-proxy-application connection. In particular embodiments, all communications are encrypted with security keys. In particular embodiments, security keys are exchanged via the token exchanger.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied. As just described, in various example embodiments, one or more described web pages or web applications are associated with a social network environment or social networking service.

Particular embodiments may operate in, or in conjunction with, a wide area network environment, such as the Internet, including multiple network addressable systems. FIG. 1A illustrates an example network environment, in which various example embodiments may operate. Internet 120 generally represents one or more interconnected networks, over which various systems and hosts described herein may communicate. Internet 120 may include packet-based wide area networks (such as the Internet), private networks, wireless networks, satellite networks, cellular networks, paging networks, and the like. As FIG. 1A illustrates, particular embodiments may operate in conjunction with a network environment comprising social network system 100 and client devices 113a-c, as well as one or more third party web application servers 140. Client devices 113a-c, web servers 40, and third-party websites 140 may be operably connected to the network environment and Internet 120 via a network service provider, a wireless carrier, a set of routers or networking switches, or any other suitable means.

Each client device 113 may generally be a computer, computing system, or computing device including functionality for communicating (e.g., remotely) over a computer network. Client device 113 in particular may be a desktop computer 113c, laptop computer, personal digital assistant (PDA), tablet PC 113b, in- or out-of-car navigation system, smart phone 113a or other cellular or mobile device, or mobile gaming device, among other suitable computing devices. Client device 113 may execute one or more client applications, such as a web browser (e.g., Microsoft Windows Internet Explorer, Mozilla Firefox, Apple Safari, Google Chrome, and Opera, etc.), to access and view content over a Internet 120. In particular implementations, the client applications allow a user of client device 113 to enter addresses of specific network resources to be retrieved, such as resources hosted by social networking system 100. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 113 desires to view a particular web page (hereinafter also referred to as a target structured document) hosted by social networking system 100, and made available in conjunction with social networking system 100, the user's web browser, or other client-side structured document rendering engine or suitable client application, formulates and transmits a request to web servers 101 of social networking system 100. The request generally includes a URL or other document identifier as well as metadata or other information. By way of example, the request may include information identifying the user, such as a user ID, as well as information identifying or characterizing the web browser or operating system running on the user's client computing device 113. The request may also include location information identifying a geographic location of the user's client device or a logical network location of the user's client device, as well as timestamp identifying when the request was transmitted.

In an example implementation, when a request for a web page or structured document hosted by social networking system 100 is received by web servers 101 of social networking system 100, one or more page-generating processes executing within the social networking system 100 typically generates a base web page in the form of a Hyper Text Markup Language (HTML), Extensible Markup Language (XML), or other web browser-supported structured document. The generated structured document is then transmitted in a response, which may comprise one or more portions or partial responses, to the requesting client 113 via a Hypertext Transfer Protocol (HTTP) or other suitable connection for rendering by the web browser at the client device 113. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social networking system 100 or at one or more external locations, to the client device 113 requesting the web page. Typically, upon receipt of the response, the web browser or other client document rendering application running at the client device 113 then constructs a document object model (DOM) representation of the received structured document and requests the resource(s) (which may be at one or more other external locations) embedded in the document.

In an example implementation, when a registered user of social networking system 100 first requests a web page from social networking system 100 in a given user session, the response transmitted to the user's client device 113 from web servers 101 of social networking system 100 may include a structured document generated by the page-generating process for rendering a login page at the client device. The user may then enter his or her user login credentials (e.g., user ID and password), which are then transmitted from the user's client device 113 to social networking system 100. Upon successful authentication of the user, social networking system 100 may then transmit a response to the user's web browser at the user's client device 113 that includes a structured document generated by the page-generating process for rendering a user homepage or user profile page at the user's client device.

In one example embodiment, social networking system 100 comprises computing systems that allow users at client devices 113 to communicate or otherwise interact with each other and access content, such as user profiles, as described herein. Social networking system 100 is a network addressable system that, in various example embodiments, comprises one or more physical servers as well as one or more data stores. The one or more physical servers are operably connected to Internet 120 via, by way of example, a set of routers or networking switches. In an example embodiment, the functionality hosted by the one or more physical servers may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

The physical servers may host functionality directed to the operations of social networking system 100. By way of example, social networking system 100 may host a website that allows one or more users, at one or more client devices 113, to view and post information, as well as communicate with one another via the website. Hereinafter, the physical servers may be referred to as web server 101, although, as just described, the servers may include numerous servers hosting, for example, social networking system 100, as well as other content distribution servers, data stores, or databases.

The data store may comprise object store 102, which may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, object store 102 corresponds to one or more of a variety of separate or integrated databases, such as relational databases and object-oriented databases, that maintain information as an integrated collection of logically related records or files stored on one or more physical systems.

In particular embodiments, object store 102 may include a number of databases. For example object store 102 may include user database 102a containing information pertaining to every single user of social networking system 100. In particular embodiments, object store 102 may include places database 102b, containing information pertaining to physical locations or businesses represented by concept nodes in social networking system 100. In particular embodiments, users or other node administrators may create event pages for particular real-world events users may attend. Information regarding these events may be stored in events database 102c. In particular embodiments, media objects, such as photos, albums, videos, and the like may be stored in media database 102d. In particular embodiments, users may share links to other content hosted on third party websites 140 or external application servers. In particular embodiments, each link may be represented by a node on the social graph. In particular embodiments, shared links may be stored as objects within share database 102e, or alternatively story database 110. In particular embodiments, each concept node may be represented by a hub page, and both the nodes and pages may be stored in pages database 102f. In particular embodiments, individual advertisements may be treated as objects within social networking system 100, and advertisements may be stored in ad database 102g. In particular embodiments, individual newsfeed stories, status updates, check-ins, and the like may be stored in story database 102h. Finally custom objects defined by third-parties may be stored in other object store 102i. Individual databases 102a-102i may be located on one or more physical servers. In particular embodiments, individual databases 102a-102i may be located in a single server. This disclosure contemplates any suitable means of storing objects of social networking system 100 in any physical configuration.

Structurally, object store 102 may generally include one or more of a large class of data storage and management systems. In particular embodiments, object store 102 may be implemented by any suitable physical system(s) including components, such as one or more database servers, mass storage media, media library systems, storage area networks, data storage clouds, and the like. In one example embodiment, object store 102 includes one or more servers, databases (e.g., MySQL), and/or data warehouses.

Object store 102 may include data associated with different social networking system 100 users, client devices 113, web servers 101 as well as, in particular embodiments, data associated with various concepts. As described above, particular embodiments relate to a social networking system 100 that includes a platform enabling an integrated social network environment. In the following example embodiments, the social network environment may be described or implemented in terms of a social graph including social graph information. In particular embodiments, object store 102 includes a the social graph database in which the social graph information for use in implementing the social network environment described herein is stored. In particular embodiments, the social graph information stored by social networking system 100 in object store 102, and particularly in the social graph database, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

In particular embodiments, social networking system 100 may include a contact importer application 103. Contact importer application 103 may, as previously discussed, attempt to connect directly to one or more external servers 140 through Internet 120. The connection 108 (represented by the dashed line) may be a direct request from web servers 101 or a separate server hosting contact importer application 103. Typically, the user provides his or her login credentials, generally a username and password, to web server 101 via a web form. Web server 101 executes contact importer application 103, or alternatively, passes on the received credentials to a separate server that executes contact importer application 103, which in turn transmits a request to third-party website or server 140 including the user's credentials and a request to obtain user data, such as a contact list, address book, or any other data associated with the user on third-party server 140. However, as previously disclosed, such techniques of requesting user data may be easily blocked by blocking or rate limiting requests from IP addresses associated with social networking system 100.

In particular embodiments, social networking system 100 may deliver a proxy application 106 to one or more clients 113. In the example of FIG. 1A, web server 101 transmits proxy application 106 to client 113c, a desktop computer. However, proxy application 106 may be executed by any suitable client device 113. In particular embodiments, proxy application 106 is a windows executable file (".exe"). In particular embodiments, proxy application 106 is a Macintosh binary. In particular applications, proxy application 106 is a Java application executed by a Java virtual machine resident on client device 113c. In particular embodiments, proxy application 106 is a signed Java applet that runs natively within the web browser of client device 113c. This disclosure contemplates any suitable method of delivery and format for proxy application 106.

In particular embodiments, web server 101 may communicate directly with proxy application 106. In particular applications, additional proxy servers 104 may proxy transmission between web server 101 and proxy application 106. In particular embodiments, token exchanger 105 may be utilized to secure the connection between web server 101 and proxy application 106, as shown by dotted connection 107. In particular embodiments, proxy server 104 may directly connect to proxy application 106 via a secure socket layer (SSL) connection. This disclosure contemplates any suitable method of proxying a request from web server 101 to third-party websites or server 140 such that the request originates from one or more client devices 113.

Figure 1B:
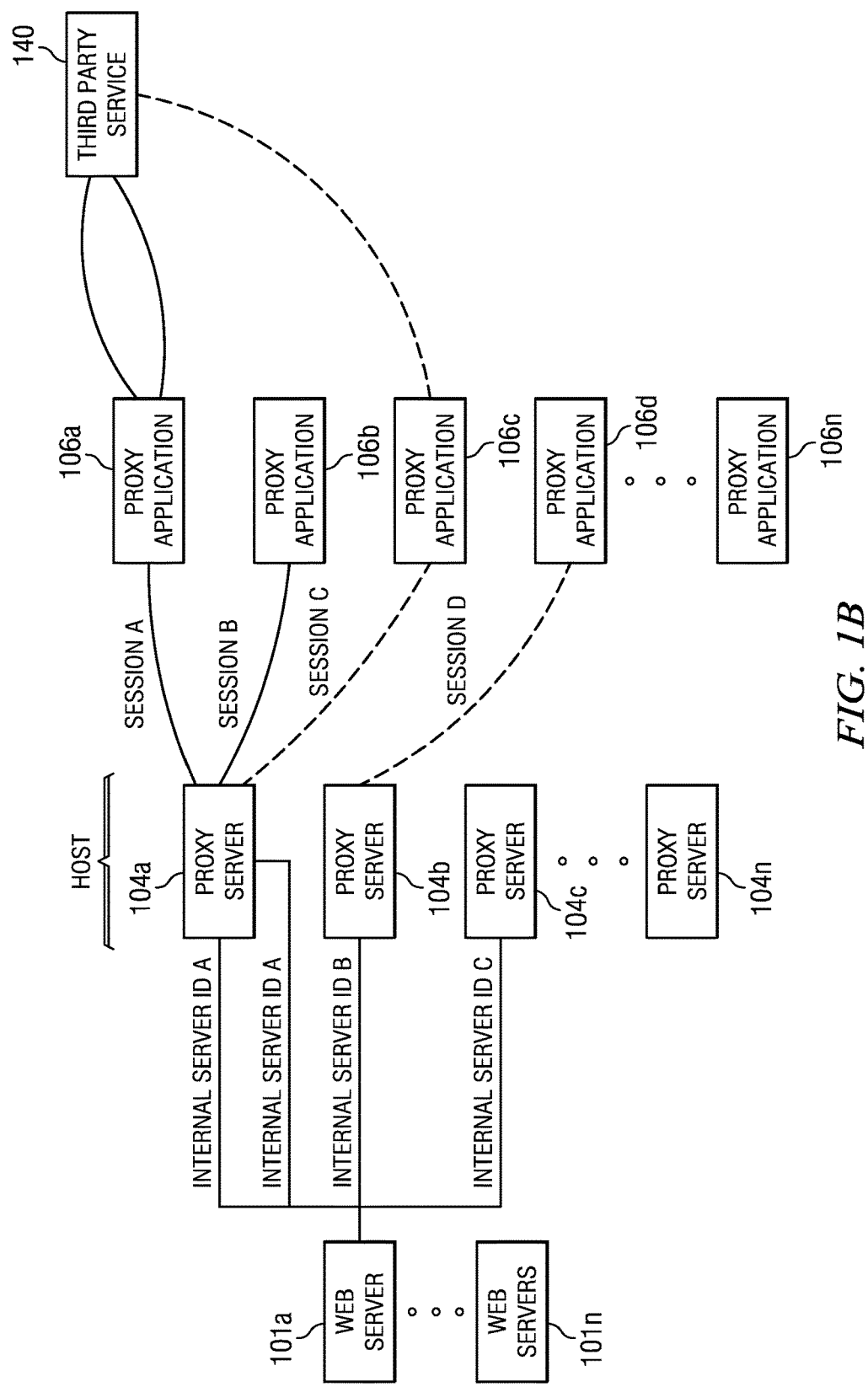
FIG. 1B illustrates an example multiplexed proxy connection for importing data from a third-party server.

FIG. 1B illustrates an example network configuration according to one embodiment. Particular embodiments allow a plurality of web servers 101a-n to connect to a plurality of proxy servers 104a-n. A single web server 101 may open multiple socket connections to a single proxy server, such as proxy server 104a in FIG. 1B. Each individual proxy server 104a-n may possess an internal server ID that uniquely identifies it to web servers 101a-n. The plurality of proxy servers 104a-n may be mapped to a single host identifier (host ID) to external endpoints. For example, a plurality of proxy servers 104a-n may appear to the outside network as a single hostname or IP address. In particular embodiments, proxy applications 106a-n connect via this host address to a particular one of proxy servers 104a-n.

Each proxy server 104a-n is capable of multiplexing a plurality of secure connections to proxy applications 106a-n. For example, proxy server 104a multiplexes connections from both proxy application 106a and proxy application 106b. In particular embodiments, in order to differentiate data flows on the multiplexed connection, each proxy application 106a-n is identified by a unique session ID. Additionally, in particular embodiments, each individual proxy application 106a-n, in this example 106a, may initiate multiple connections to third-party server 140. However, because each proxy application 106 only has one established socket connection to proxy server 104, multiplexing of these data flows is necessary. Thus, particular embodiments provide a method for requesting multiple socket connections for web requests to third party servers 140 over a single multiplexed established socket connection.

Figure 2:
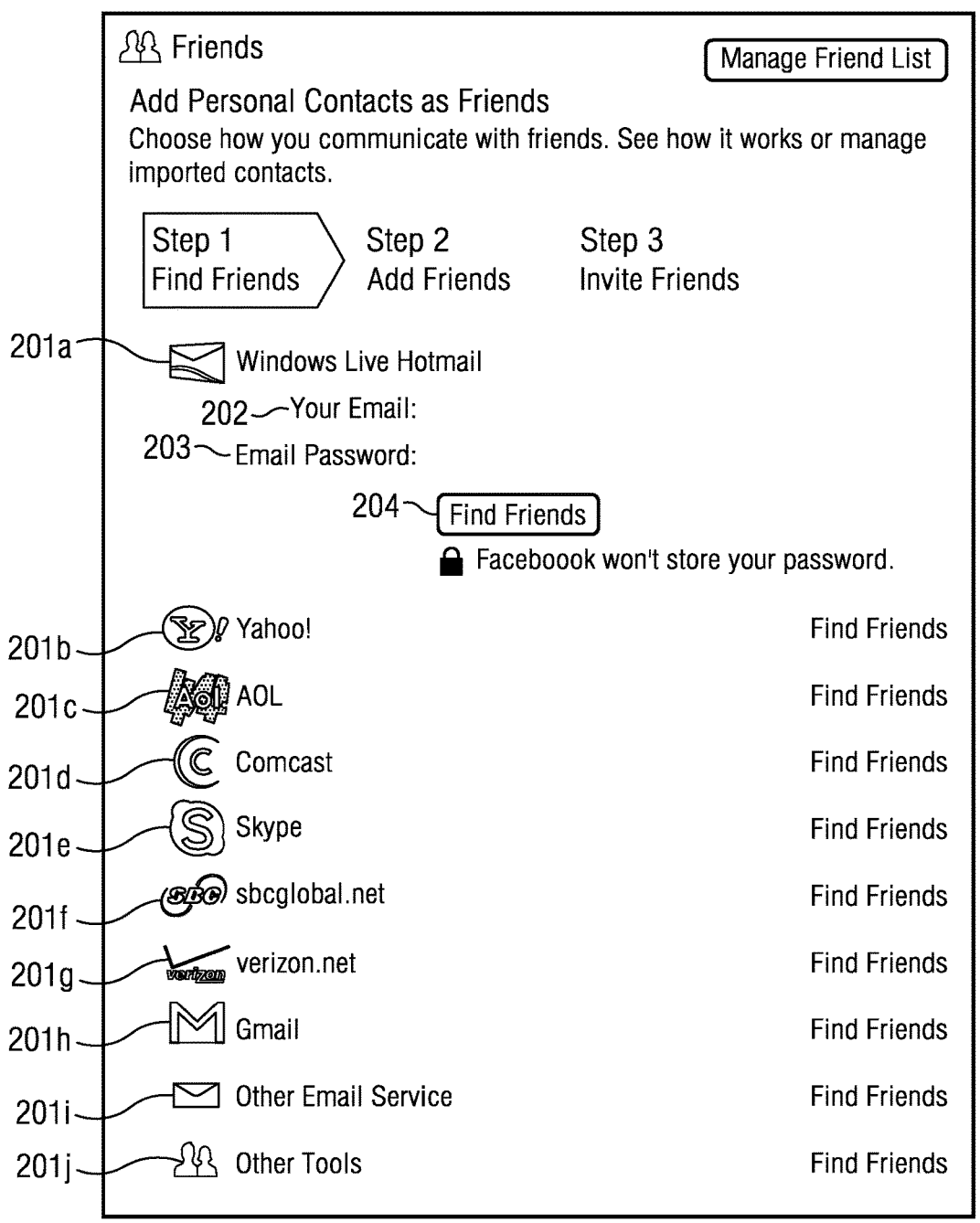
FIG. 2 is an example user interface for a contact importer application.

FIG. 2 illustrates an example user interface 200 for a contact importer application. In particular embodiments, the contact importer application user interface 200 is displayed on a web page transmitted by web servers 101 to a particular user of social networking system 100. User interface 200 includes one or more services 201a-j on which the user may maintain an account from which the user wishes to export contact information. In particular embodiments, upon clicking the "find friends" link or other user interface element for each of services 201a-h, web server 101 may display fields 202 and 203 to the user. Fields 202 and 203 allow the user to enter his or her authentication credentials for the particular service. In this example, user interface 200 includes email address field 202 and password 203 that social networking system 100 may utilize to access the user's account on service 201a (in this example "Windows Live Hotmail"). Although FIG. 2 depicts two fields 202 and 203, user interface 200 may include as few or as many fields are required to access a particular user account for a particular service. In particular embodiments, client device 113 may include a physical token reader, and the user may supply authentication credentials for a particular service by swiping a physical token such as a credit card, RFID (radio frequency identification), or NFC (near field communication) device. After entering his or her credentials, the user may select "find friends" button 204 to initiate the contact import process described with further reference to FIG. 4.

FIG. 3 illustrates a sample GUI (graphical user interface) 300 displayed to a user via web servers 101 after the contact importing application has found user accounts on social networking system 100 corresponding to one or more imported contacts. GUI 300 includes one or more contacts 301-304 that the user may add as friends by selecting "add friends" button 305. Although FIG. 3 depicts an "add friends" button 305, the user may perform any suitable action with any amount of data scraped from third-party service 140. For example, the user may choose to add the imported email address to an address book on social networking system 100.

While FIGS. 2 and 3 depict pulling address book or contact information from e-mail services, this disclosure contemplates pulling any type of data from any type of third-party service 140 that attempts to block IP addresses or rate-limit accesses from particular IP addresses. For example, a user may choose to extract a log of all instant messages from the servers of an instant messaging service (e.g., AIM, Yahoo!, ICQ, QQ, GTalk, etc.) and import them as conversations in a messaging mailbox of social networking system 100. As another example, the user may seek to import profile information from his or her profile on another social networking system, such as interests, hobbies, political views, blog posts, etc. to reduce the time required to fully migrate from one social networking system to another. In particular embodiments, the user may import address or payment information from an online retailer. For example, the user may wish to utilize his or her shipping address and payment information from Amazon.com. In particular embodiments, the user may wish to import a list of all purchases from a particular online retailer; as an example, the user may wish to share all his or her Amazon.com purchases on social networking system 100. In particular embodiments, the user may export all previous status updates from another social networking system for importation into his or her timeline, wall, or feed on social networking system 100. For example, the user may wish to export all his tweets from Twitter and place them, by date, into their corresponding location on his or her wall or timeline. This disclosure contemplates scraping any type of data from any particular third-party site, and any subsequent actions on the imported data.

Although this disclosure describes importing data into a social networking system, this disclosure contemplates importing data into non-social applications. For example, a user may wish to download a large amount of technical support documents from a particular site that rate limits downloads. As another example, a user may wish to download other media, such as video, from a web-site that rate limits particular users or IP addresses. This disclosure contemplates any suitable application that benefits from the circumvention of rate limiting or download-limiting measures.

Figure 4:
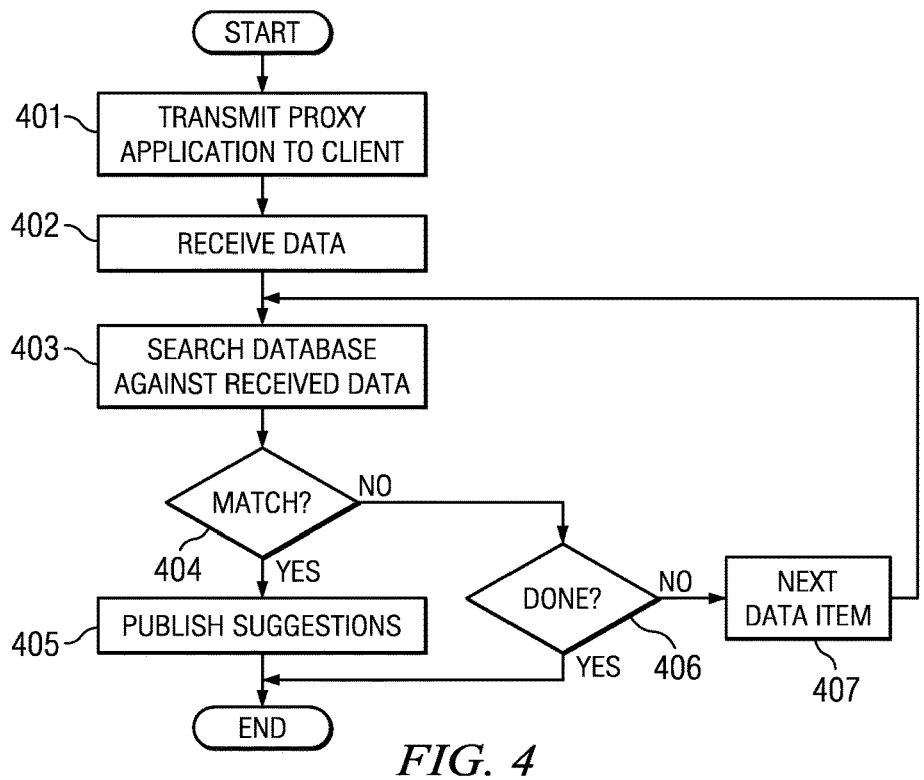
FIG. 4 is an example method for importing contacts and searching them against users of a social networking system.

FIG. 4 illustrates a method for importing contacts and generating suggestions based on the imported contacts. At Step 401, social networking system 100 transmits, via web servers 101, proxy application 106 to the client device 113. As previously disclosed, proxy application 106 may be of any suitable format. In particular embodiments, social networking system 100's web servers 100 do not perform any steps between transmitting proxy application 106 and receiving the requested data. In particular embodiments, web server 101 is responsible for communicating with a particular proxy server 104, as described further with reference to FIG. 5.

At Step 402, web server 101 receives a set of data exported from the servers of third-party service 140. In particular embodiments, the exported data is simply a list of email addresses from the user's address book. At Step 403, social networking system 100 searches user database 102*a* against the received data. For example, each user account in user database 102*a* has one or more email addresses associated with it. In particular embodiments, social networking system 100 may search each received email address across all email addresses stored in user database 102*a*. If there is a match at Step 404, social networking system publishes the user account associated with the matching email address to the user via web server 101 at Step 405. In particular embodiments, if there is not a match, social networking system 100 checks if more email addresses have not been searched, and iterates at Step 407 to the next item. The process repeats until all the imported email addresses have been searched, and social networking system 100 displays the user interface 300 of FIG. 3 to the user.

Figure 5A:
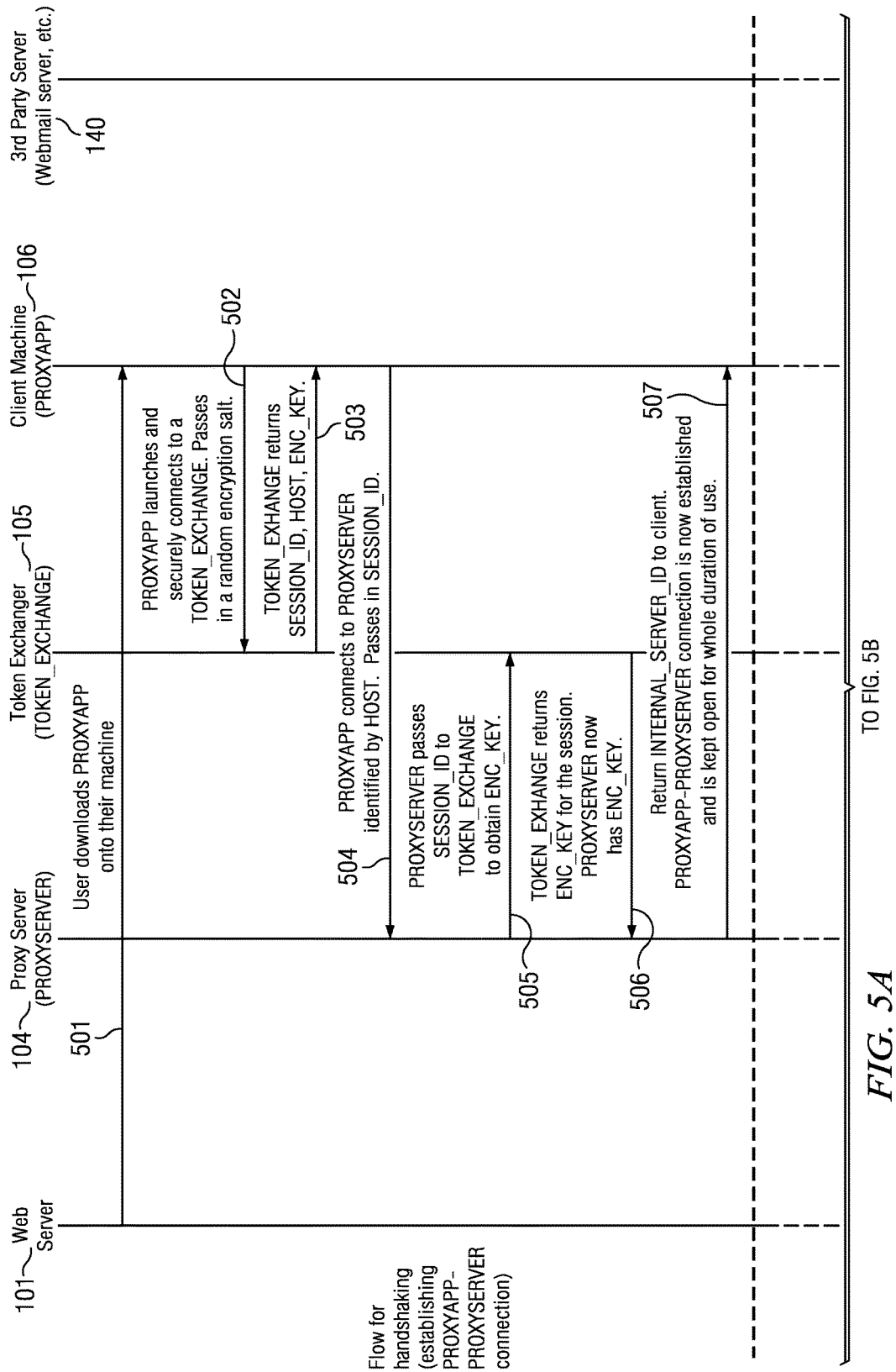
FIG. 5A is an example call flow diagram for establishing a proxy connection.
Figure 5B:
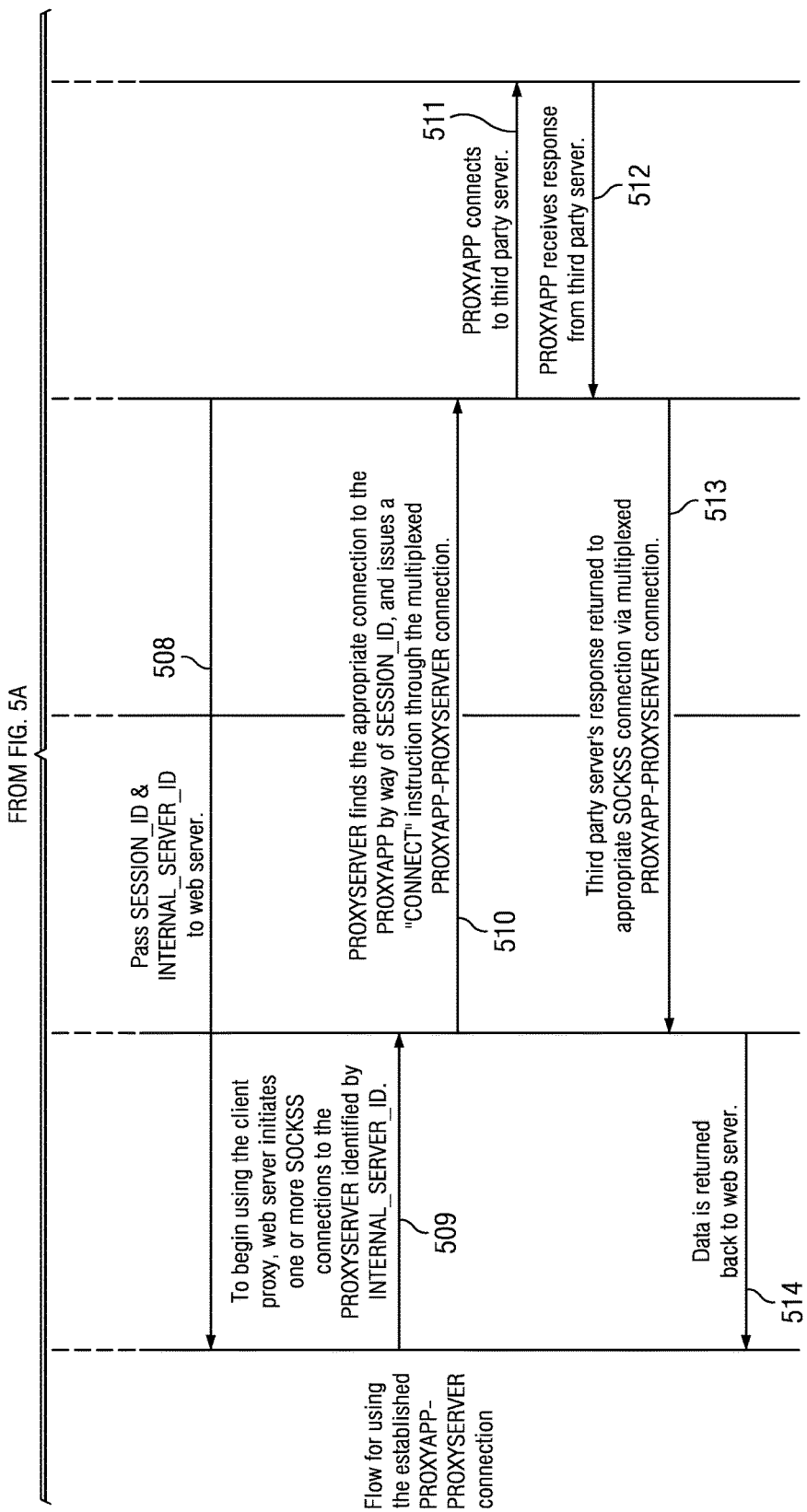
FIG. 5B is an example call flow diagram for using an established proxy connection.

FIG. 5A illustrates an example flow diagram for establishing a connection from web server 101 to third-party server 140 via a proxy server 104, token exchanger 105, and proxy application 106. Steps 501-507 illustrate call flows for handshaking and establishing a secure connection between proxy server 104 and proxy application 106, whereas FIG. 5B (Steps 508-514) illustrate call flows for utilizing the established secure connection to perform a proxied request for data from a third-party server 140.

At Step 501 the user downloads proxy application onto their client device 113. In particular embodiments, this occurs when the user clicks or selects the "find friends" button 204 on GUI 200. In particular embodiments, client 113 installs proxy application 106 when he or she logs into social networking system 100 for the first time. This disclosure contemplates any suitable timing for the download and execution of proxy application 106. As previously discussed, proxy application 106 may be a native executable file (Windows EXE, Macintosh binary, Java application) that the user downloads and runs, or a signed Java applet that runs natively within the browser application of client device 113. This disclosure contemplates any suitable format for proxy application 106.

At Step 502, proxy application 106 launches and securely connects to token exchanger 105. In particular embodiments, token exchanger 105 is an intermediary for obtaining a token securely. In particular embodiments, proxy application 106 transmits a random encryption salt to token exchanger 105 in Step 502. As is well-known in the art, an encryption salt comprises a series of random bits creating one of the inputs to a one-way function. In particular embodiments, proxy application 106 may transmit another input such as a password or passphrase. Token exchanger 105 may be an HTTPS (hypertext transfer protocol secure) endpoint implementing SSL (secure socket layer)/TLS (transport layer security) encryption. In particular embodiments, token exchanger 105 may implement another type of secure channel. This disclosure contemplates any suitable security protocol implemented between proxy application 106 and token exchanger 105.

At Step 503, token exchanger 105 returns a session ID, host, and encryption key to proxy application 106. The session ID is a unique identifier for the instance of proxy application 106 on client device 113. Thus, each proxy application 106 across all client devices 113 has a unique session ID when connecting to social networking system 100, allowing a single proxy server 104 to establish multiple connections to a plurality of proxy applications 106. In such embodiments, the connection between proxy server 104 and proxy application 106 is multiplexed, and proxy server addresses each unique proxy application 106 via its session ID.

In particular embodiments, each proxy server 104 includes two addresses, an internal server ID for addressing the proxy server within social networking system 100 or a local intranet, and an external address (host address) for communicating with the proxy server via an internet such as the public IP network (Internet). The host value returned from token exchanger 105 to proxy application 106 is the host name or IP address of one or more proxy servers 104 with which it communicates; multiple servers may reside behind HOST, and the internal server ID is used to disambiguate between them internally.

The encryption key passed from token exchanger 105 to proxy application 106 may be utilized to encrypt communications between proxy servers 104 and proxy application 106. In particular embodiments, the encryption key may be an RC4 ("Rivest Cipher 4" or "Ron's Code 4") key. In particular embodiments, the encryption key may utilize a different encryption cipher, such as RC2, RC5, RC6, RC4, and the like. This disclosure contemplates any suitable symmetric or asymmetric cryptography. In particular embodiments, token exchange 105 may be omitted completely, such as if all socket connections are implemented with SSL encryption.

At Step 504, proxy application 106 connects to the address corresponding to the host id, thereby connecting proxy application 106 to a particular proxy server 104. In particular embodiments, proxy server 104 exposes a custom protocol interface for proxy application 106 to connect to. In particular embodiments, proxy server 104 exposes a SOCKS5 interface for web servers 101 to connect to. In particular embodiments, the connection between proxy application 106 and proxy server 104 may be a SOCKS5 connection. This disclosure contemplates any suitable communication protocol between proxy server 104 and proxy application 106. Additionally, at Step 504, proxy application 106 returns its unique session identifier received from token exchanger 105 to proxy server 104.

At Step 505, proxy server 104 transmits the received session ID to token exchanger 105 in order to obtain the encryption key. At Step 506, token exchanger 105 responds by transmitting the encryption key for the particular session ID to proxy server 104. At this point, both proxy server 104 and proxy application 106 possess the encryption key, and may therefore securely transmit and receive data encrypted by the encryption key. The use of a secure channel between token exchanger 105 and other endpoints (proxy application 106 and proxy server 104) prevents hijacking of an encryption key during handshaking.

At Step 507, the particular proxy server 104 with which proxy application 106 returns its internal server ID to proxy application 106. In particular embodiments, this message is encrypted with the encryption key, and proxy application 106 must decrypt the message upon reception with the encryption key. The proxy-server-proxy-application connection is considered to be established at this point, and the connection is kept open for the entire duration of use.

At Step 508, proxy application 106 passes its session ID and internal server ID to web server 101. Thus, the web server knows both the particular proxy server 104 (identified by the internal server ID) to which proxy application 106 is connected, as well as the particular instance (identified by the session ID) in the multiplexed connection corresponding to proxy application 106. Thus, web server 101 may utilize the specific proxy-server-proxy-application connection to initiate a request to an external third-party service 140.

At Step 509, web server 101 initiates one or more SOCKS5 connections to exposed SOCKS5 interfaces on the particular proxy server 104 identified by the internal server ID. As illustrated in FIG. 1AB, web server 101 may initiate multiple SOCKS5 connections for web requests to an external server 140 via proxy server 104 and proxy application 106; however, proxy application 106 only has one established socket connection to proxy server 104.

At Step 510, proxy server 104 finds the appropriate connection to the particular proxy application 106 identified by the session ID, and issues a "connect" instruction through the multiplexed proxy-server-proxy-application connection. In particular embodiments, the connect instruction includes the hostname or IP address of third-party server 140. In particular embodiments, proxy server 104 may transmit a data packet to proxy application, which in turn sends the raw bytes of data to third party server 140. In particular embodiments, the connect instruction includes authentication credentials obtained from GUI 200. In particular embodiments, the authentication credentials are transmitted in a raw data packet.

At Step 511, proxy application 106 connects to third-party server 140. In particular embodiments, the connection may be an HTTP or HTTPS request. At Step 512, proxy application 106 receives a response from third-party server 140. In particular embodiments, the response may be the requested data, an error message, or a timeout.

At Step 513, proxy application 106 relays the response from third-party server 140 to proxy server 104. In particular embodiments, the response is relayed over the multiplexed proxy-server-proxy-application connection and delivered to the proper SOCKS5 connection corresponding to the request transmitted in Step 504. In particular embodiments, each proxy application 106 may submit multiple HTTP requests to one or more external servers 140. In such embodiments, each response may also include a unique request identifier. This disclosure contemplates any suitable multiplexing of responses to proxy application 106. In particular embodiments, the responses originating from proxy application 106 to proxy server 104 may include an acknowledgement that a connection to third-party server 140 was successfully established or failed, a data packet of raw bytes, or a disconnect command. At Step 514, the requested data is returned back to web server 101 over a SOCKS5 connection from proxy server 104.

Figure 6:
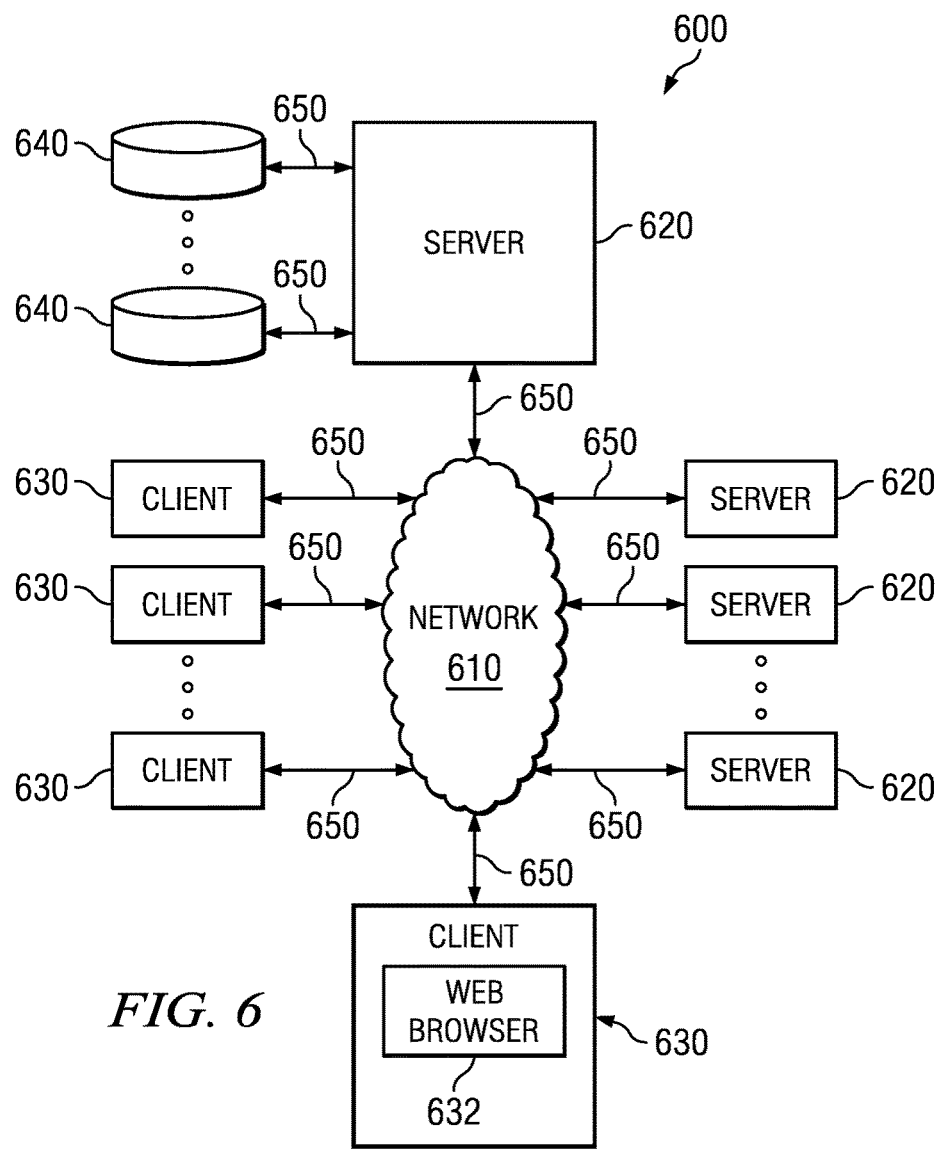
FIG. 6 illustrates an example network environment.

While the foregoing embodiments may be implemented in a variety of network configurations, the following illustrates an example network environment for didactic, and not limiting, purposes. FIG. 6 illustrates an example network environment 600. Network environment 600 includes a network 610 coupling one or more servers 620 and one or more clients 630 to each other. Network environment 600 also includes one or more data storage 640 linked to one or more servers 620. Particular embodiments may be implemented in network environment 600. For example, social networking system frontend 120 may be written in software programs hosted by one or more servers 620. For example, event database 102 may be stored in one or more storage 640. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. The present disclosure contemplates any suitable network 610.

One or more links 650 couple a server 620 or a client 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functions implemented or supported by client 630. For example and without limitation, a client 630 may be a desktop computer system, a notebook computer system, a netbook computer system, a handheld electronic device, or a mobile telephone. The present disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 7:
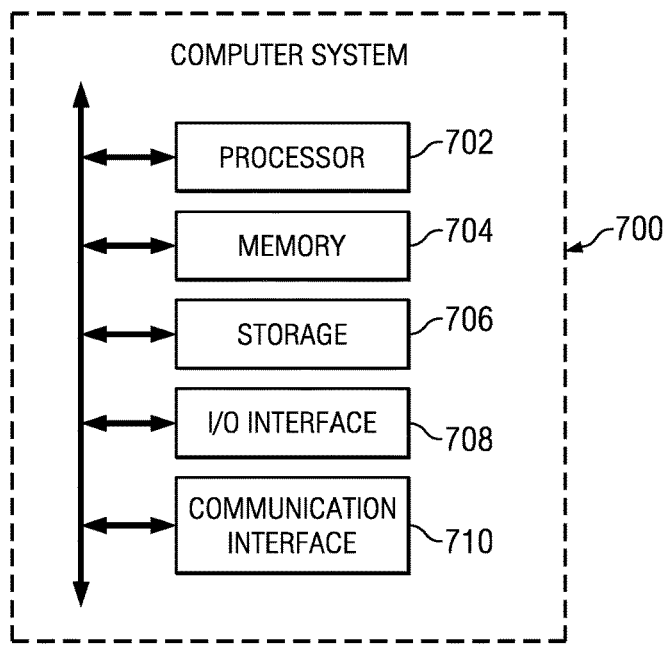
FIG. 7 illustrates an example computer system architecture.

FIG. 7 illustrates an example computing system architecture, which may be used to implement a server. In one embodiment, hardware system 700 comprises a processor 702, a cache memory 704, and one or more executable modules and drivers, stored on a tangible computer readable medium, directed to the functions described herein. Additionally, hardware system 700 includes a high performance input/output (I/O) bus 706 and a standard I/O bus 708. A host bridge 708 couples processor 702 to high performance I/O bus 706, whereas I/O bus bridge 712 couples the two buses 706 and 708 to each other. A system memory 714 and one or more network/communication interfaces 716 couple to bus 706. Hardware system 700 may further include video memory (not shown) and a display device coupled to the video memory. Mass storage 717, and I/O ports 720 couple to bus 708. Hardware system 700 may optionally include a keyboard and pointing device, and a display device (not shown) coupled to bus 708. Collectively, these elements are intended to represent a broad category of computer hardware systems, including but not limited to general purpose computer systems based on the x76-compatible processors manufactured by Intel Corporation of Santa Clara, Calif., and the x76-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 702.3) network, a backplane, etc. Mass storage 717 provides permanent storage for the data and programming instructions to perform the above-described functions implemented in the servers 22a, 22b, whereas system memory 714 (e.g., DRAM) provides temporary storage for the data and programming instructions when executed by processor 702. I/O ports 620 are one or more serial and/or parallel communication ports that provide communication between additional peripheral devices, which may be coupled to hardware system 700.

Hardware system 700 may include a variety of system architectures; and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

In one implementation, the operations of the embodiments described herein are implemented as a series of executable modules run by hardware system 700, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 702. Initially, the series of instructions may be stored on a storage device, such as mass storage 717. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 716. The instructions are copied from the storage device, such as mass storage 717, into memory 714 and then accessed and executed by processor 702.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. By way of example, while embodiments have been described as operating in connection with a social networking website, the disclosure can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A method comprising:
    sending, from a social-networking system, by way of a proxy application installed on a client computing device associated with a user of the social-networking system, a request addressed to a third-party server for contact information associated with one or more users of one or more services associated with the third-party server, wherein:
        the request obscures any identification of the social-networking system by at least obscuring network information associated with the social-networking system, and
        the proxy application comprises instructions to cause the proxy application to:
            initiate one or more secure connections with a token exchanger,
            receive, from the token exchanger, a unique session ID, a host ID, and an encryption key, wherein the host ID identifies a proxy server, and
            initiate one or more secure connections with the proxy server;
    receiving, at the social-networking system, from the third-party server and by way of the proxy application, the contact information;
    cross-referencing, by the social-networking system, the contact information received from the third-party server with a database of user information of users of the social-networking system;
    identifying, by the social-networking system, based at least in part on the cross-referencing, one or more of the users of the services who are also users of the social-networking system; and
    sending, by the social-networking system, to the client computing device, information identifying one or more accounts of the social-networking system, wherein each of the accounts is associated with one or more of the users of the services who are also users of the social-networking system.

2. The method of claim 1, wherein the user information comprises one or more of:
    one or more message logs;
    profile information associated with one or more of the users of the third-party services;
    online retailer information associated with the user who is associated with the computing device; or
    profile information associated with the user who is associated with the computing device.

3. The method of claim 1, wherein one or more of the secure connections are SOCKS5 protocol connections.

4. The method of claim 1, wherein the instructions cause the proxy application to:
    send the session ID to the proxy server.

5. The method of claim 4, wherein the instructions cause the proxy application to:
    receive, from the proxy server, an internal server ID, wherein the internal server ID was sent from the proxy server after:
        the proxy server sent to the token exchanger the session ID; and
        the proxy server received from the token exchanger the encryption key; and
    send to the social-networking system the session ID and the internal server ID.

6. The method of claim 5, further comprising establishing, by the social-networking system, one or more secure connections with the proxy server.

7. One or more non-transitory computer-readable storage media embodying software that is operable when executed by one or more computing systems associated with a social-networking system to:
    send by way of a proxy application installed on a client computing device associated with a user of the social-networking system, a request addressed to a third-party server for contact information associated with one or more users of one or more services associated with the third-party server, wherein:
        the request obscures any identification of the social-networking system by at least obscuring network information associated with the social-networking system, and
        the proxy application comprises instructions to cause the proxy application to:
            initiate one or more secure connections with a token exchanger,
            receive, from the token exchanger, a unique session ID, a host ID, and an encryption key, wherein the host ID identifies a proxy server, and initiate one or more secure connections with the proxy server;
receive, from the third-party server and by way of the proxy application, the contact information;
cross-reference the contact information received from the third-party server with a database of user information of users of the social-networking system;
identify, based at least in part on the cross-referencing, one or more of the users of the services who are also users of the social-networking system; and
send, to the client computing device, information identifying one or more accounts of the social-networking system, wherein each of the accounts is associated with one or more of the users of the services who are also users of the social-networking system.

8. The media of claim 7, wherein the user information comprises one or more of:
one or more message logs;
profile information associated with one or more of the users of the third-party services;
online retailer information associated with the user who is associated with the computing device; or
profile information associated with the user who is associated with the computing device.

9. The media of claim 7, wherein one or more of the secure connections are SOCKS5 protocol connections.

10. The media of claim 7, wherein the instructions cause the proxy application to:
send the session ID to the proxy server.

11. The media of claim 10, wherein the instructions cause the proxy application to:
receive, from the proxy server, an internal server ID, wherein the internal server ID was sent from the proxy server after:
the proxy server sent to the token exchanger the session ID; and
the proxy server received from the token exchanger the encryption key; and
send to the social-networking system the session ID and the internal server ID.

12. The media of claim 11, further comprising establishing, by the social-networking system, one or more secure connections with the proxy server.

13. A system comprising:
one or more processors associated with a social-networking system; and
a memory coupled to the processors comprising instructions executable by the processors, the processors being operable when executing the instructions to:
send by way of a proxy application installed on a client computing device associated with a user of the social-networking system, a request addressed to a third-party server for contact information associated with one or more users of one or more services associated with the third-party server, wherein:
the request obscures any identification of the social-networking system by at least obscuring network information associated with the social-networking system, and
the proxy application comprises instructions to cause the proxy application to:
initiate one or more secure connections with a token exchanger,
receive, from the token exchanger, a unique session ID, a host ID, and an encryption key, wherein the host ID identifies a proxy server, and
initiate one or more secure connections with the proxy server;
receive, from the third-party server and by way of the proxy application, the contact information;
cross-reference the contact information received from the third-party server with a database of user information of users of the social-networking system;
identify, based at least in part on the cross-referencing, one or more of the users of the services who are also users of the social-networking system; and
send, to the client computing device, information identifying one or more accounts of the social-networking system, wherein each of the accounts is associated with one or more of the users of the services who are also users of the social-networking system.

14. The system of claim 1, wherein the user information comprises one or more of:
one or more message logs;
profile information associated with one or more of the users of the third-party services;
online retailer information associated with the user who is associated with the computing device; or
profile information associated with the user who is associated with the computing device.

15. The system of claim 13, wherein one or more of the secure connections are SOCKS5 protocol connections.

16. The system of claim 13, wherein the instructions cause the proxy application to:
send the session ID to the proxy server.

17. The system of claim 16, wherein the instructions cause the proxy application to:
receive, from the proxy server, an internal server ID, wherein the internal server ID was sent from the proxy server after:
the proxy server sent to the token exchanger the session ID; and
the proxy server received from the token exchanger the encryption key; and
send to the social-networking system the session ID and the internal server ID.

18. The system of claim 17, further comprising establishing, by the social-networking system, one or more secure connections with the proxy server.

* * * * *